(12) United States Patent
Sakai et al.

(10) Patent No.: US 6,570,123 B2
(45) Date of Patent: May 27, 2003

(54) METHOD OF PRODUCING JIG FOR THREE DIMENSIONAL LINEAR CUTTING MACHINING

(75) Inventors: Yoshihiko Sakai, Gifu-ken (JP); Masafumi Ueno, Gifu-ken (JP); Yoshihisa Yamaoka, Gifu-ken (JP); Naoomi Miyagawa, Gifu-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/068,825

(22) Filed: Feb. 5, 2002

(65) Prior Publication Data

US 2002/0107607 A1 Aug. 8, 2002

(30) Foreign Application Priority Data

Feb. 6, 2001 (JP) .......................... 2001-029309

(51) Int. Cl.[7] .............................. B23K 26/38
(52) U.S. Cl. ................................. 219/121.72
(58) Field of Search ................. 219/121.72, 121.67, 219/121.68, 121.69, 121.7, 121.71, 121.39, 121.41, 121.44, 121.82, 121.84

(56) References Cited

U.S. PATENT DOCUMENTS

| | | | | |
|---|---|---|---|---|
| 4,621,185 A | * | 11/1986 | Brown | 219/124.34 |
| 5,227,606 A | * | 7/1993 | Weeks et al. | 219/121.67 |
| 5,268,331 A | * | 12/1993 | Abbott | 427/569 |
| 5,718,279 A | * | 2/1998 | Satoh et al. | 164/456 |
| 5,796,191 A | * | 8/1998 | Schwanda | 310/58 |
| 6,419,146 B1 | * | 7/2002 | Buldhaupt et al. | 228/193 |
| 6,479,305 B2 | * | 11/2002 | Kono et al. | 438/14 |

* cited by examiner

Primary Examiner—Tom Dunn
Assistant Examiner—Jonathan Johnson
(74) Attorney, Agent, or Firm—Duane Morris LLP (57) ABSTRACT

When a jig to be used at the time of cutting and machining a workpiece W with a laser beam machine 1 is produced, a shape of a workpiece supporting portion 23a for supporting the workpiece by abutting on the workpiece at the time of supporting the workpiece is produced from drawing data CD showing the three dimensional shape of the workpiece.

16 Claims, 12 Drawing Sheets

METHOD OF PRODUCING JIG FOR THREE DIMENSIONAL LINEAR CUTTING MACHINING

BACKGROUND OF THE INVENTION

This invention relates to a method of producing a jig for use at the time of fixing a workpiece when three dimensional cutting machining is executed on a workpiece with a three dimensional linear cutting machine, such as a laser beam machine and a plasma gas cutting device.

In the three dimensional linear cutting machining with laser beam or plasma gas, a jig for fixing a workpiece at the time of machining is used in order to machine a workpiece having solid shape.

In order to produce such a jig, much time and many costs are necessary in a conventional way since a craftsman manually produces it every workpiece to be machined.

Under this situation, the time and cost necessary for producing the jig is bigger than ones for cutting machining on a workpiece itself. Such an inclination is specifically outstanding when the number of workpieces to be machined is small, and is an obstruction for realizing production of many kinds of articles with small quantity which is a recent course.

The object of the present invention is to provide a method of producing a jig for three dimensional linear cutting machining, capable of easily producing a jug for three dimensional cutting machining without a craftsman, taking the above-mentioned situation into consideration.

SUMMARY OF THE INVENTION

The invention of claim 1 is a method of producing jig for three dimensional linear cutting machining when a jig to be used for fixing a workpiece is produced at the time of executing cutting machining on said workpiece with the three dimensional linear cutting machining unit; comprising:

producing a shape of a workpiece supporting portion for supporting said workpiece by abutting on said workpiece from drawing data showing three dimensional shape of said workpiece when said workpiece is supported on a table of said three dimensional linear cutting machining unit through said jig;

cutting two or more jig parts each having a shape corresponding to said shape of said workpiece supporting portion out of a material sheet on the basis of said shape of said workpiece supporting portion produced; and assembling said two or more jig parts cut out and producing a jig assembly having said shape corresponding to said workpiece supporting portion by said jig parts assembled.

According to the invention of claim 1, the jig assembly to be used at the time of machining the workpiece can be assembled and produced, forming the workpiece supporting portion having the shape corresponding to the three dimensional shape of the workpiece from the drawing data showing the three dimensional shape of the workpiece, and the jig for three dimensional linear cutting machining can be easily produced without a skilled person.

The invention of claim 2 is the method of producing jig for three dimensional linear cutting machining as set forth in claim 1, wherein said jig parts are cut and machined with said three dimensional linear cutting machining unit for machining said workpiece supported by said jig parts.

According to the invention of claim 2, the jig parts is cut and machined with the three dimensional linear cutting machining unit for machining the workpiece supported by the jig parts. Then, it is not necessary to specifically prepare the three dimensional linear cutting machining unit for machining the jig parts, and the jig assembly can be economically produced.

The invention of claim 3 is the method of producing jig for three dimensional linear cutting machining as set forth in claim 1, wherein said two or more jig parts are cut out of the same material sheet.

According to the invention of claim 3, two or more jig parts are cut out of the same material sheet, thereby many jig parts can be effectively cut out.

The invention of claim 4 is the method of producing jig for three dimensional linear cutting machining as set forth in claim 1, wherein said jig assembly is produced by attaching said jig parts on a jig base for supporting said jig assembly with respect to said table.

According to the invention of claim 4, the jig parts is attached on the jig base, thereby the jig assembly can be produced with good accuracy.

The invention of claim 5 is the method of producing jig for three dimensional linear cutting machining as set forth in claim 1, wherein identification marks are attached to said two or more jig parts for indentifying these jig parts, and said identification marks are attached to a corresponding jig parts with said three dimensional linear cutting machining unit when said jig parts are cut out of said material sheet so as to identify by the naked eye.

According to the invention of claim 5, the respective jig parts can be easily identified by the identification marks, thereby the jig parts are recognized without confusion when many jig parts are cut out of the material sheet, and the jig assembly can be effectively assembled.

The invention of claim 6 is the method of producing jig for three dimensional linear cutting machining as set forth in claim 4, wherein a first parts connecting means is formed at said jig parts, and said jig parts are attached to said jig base through said first parts connecting means.

According to the invention of claim 6, the connection between the jig parts and the jig base can be made certain by the parts connecting means.

The invention of claim 7 is the method of producing jig for three dimensional linear cutting machining as set forth in claim 4, wherein a second parts connecting means is formed at said jig base, and said jig parts are attached to said jig base through said second parts connecting means.

According to the invention of claim 7, the connection between the jig parts and the jig base can be made certain by the parts connecting means.

The invention of claim 8 is the method of producing jig for three dimensional linear cutting machining as set forth in claim 1, wherein said two or more sheets of jig parts are assembled such that said jig parts are located at a predetermined interval in a first direction so as to be parallel to each other, and said jig parts are located at a predetermined interval in a second direction intersecting said first direction so as to be parallel to each other.

According to the invention of claim 8, the jig parts are assembled, locating in the direction intersecting each other, thereby the jig parts intersecting each other are assembled, supporting one by the other, and many jig parts can be assembled without a complex supporting means.

The invention of claim 9 is the method of producing jig for three dimensional linear cutting machining as set forth in claim 5, wherein said three dimensional linear cutting machining unit is a laser beam machine, and said identification mark is attached to said jig parts with a torch of said laser beam machine, by printing, baking a surface of said material sheet.

According to the invention of claim 9, the identification mark is attached, taking use of the torch for machining the workpiece, and it can be attached without a specific machine thereby.

The invention of claim 10 is the method of producing jig for three dimensional linear cutting machining as set forth in claim 4, wherein said identification mark showing a position for installing said jig parts is attached to said jig base so as to identify by the naked eye with said three dimensional linear cutting machining unit when said jig base is cut out of said material sheet.

According to the invention of claim 10, the jig parts corresponding to each position of the jig base can be attached without an error by the identification mark attached on the jig base.

The invention of claim 11 is the method of producing jig for three dimensional linear cutting machining as set forth in claim 1, wherein a workpiece moving prevention means is formed at said jig assembly for preventing said workpiece located on said jig assembly from moving.

According to the invention of claim 11, the workpiece can be prevented from slipping down from the jig assembly with the movement of a table by the workpiece moving prevention means when a workpiece is machined with the three dimensional linear cutting machining unit.

The invention of claim 12 is the method of producing jig for three dimensional linear cutting machining as set forth in claim 11, wherein said workpiece moving prevention means is a workpiece provisional locking portion formed at said jig parts, said workpiece provisional locking portion is simultaneously machined when said jig parts are cut out of said material sheet.

According to the invention of claim 12, the workpiece provisional locking portion is simultaneously machined when the jig parts is cut out of the material sheet, and specific work for machining on the workpiece provisional locking portion is not necessary thereby.

The invention of claim 13 is the method of producing jig for three dimensional linear cutting machining as set forth in claim 1, wherein said drawing data showing said three dimensional shape of said workpiece are drawing data concerning a drawing showing machining shape to be cut and machined on said workpiece with said three dimensional linear cutting machining unit.

According to the invention of claim 13, the drawing data concerning the drawings showing the machining shape of the workpiece to be machined are appropriable for producing the jig as they are, and it is not necessary to prepare different drawing for producing the jig assembly.

The invention of claim 14 is the method of producing jig for three dimensional linear cutting machining as set forth in claim 1, wherein a plurality of said workpiece supporting portion shapes are produced so as to support a plurality of workpieces on a single jig assembly.

According to the invention of claim 14, a plurality of workpieces can be supported on a single jig assembly, thereby machining on many workpieces can be simultaneously executed, and its machining efficiency is high and the operation rate of the jig can be made higher.

The invention of claim 15 is the method of producing jig for three dimensional linear cutting machining as set forth in claim 1, wherein a plurality of kinds of said workpiece supporting portion shapes are produced concerning a different workpiece so as to support a plurality of kinds of workpieces on a single jig assembly.

According to the invention of claim 15, a plurality of kinds of workpieces can be supported on a single jig assembly, thereby machining on many kinds of workpieces can be simultaneously executed, the machining efficiency can be highly maintained also in production of many kinds of articles with small quantity, and besides, the operation rate of the jig can be made higher.

The invention of claim 16 is the method of producing jig for three dimensional linear cutting machining as set forth in claim 1, wherein a plurality of different workpiece supporting portion shapes are produced concerning the same workpiece so as to support on a single jig assembly, changing a locating state of the same workpiece.

Figure 12:
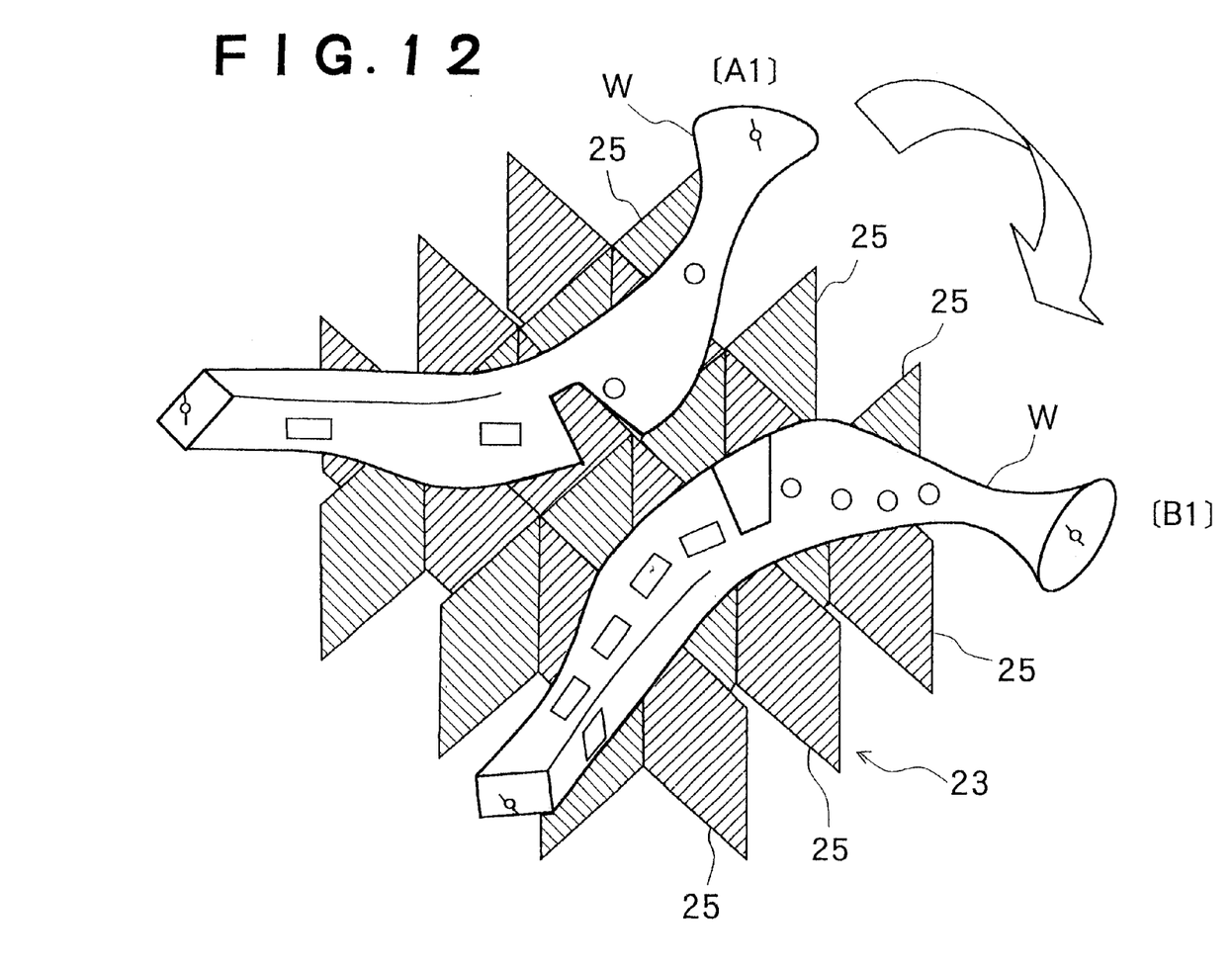
FIG. 12 is a view obliquely seen for showing a further another example of the jig assembly.

According to the invention of claim 16, the same workpiece can be supported on a single jig assembly, changing its locating state (by reversely rotating the workpiece W from the locating state A1 into the locating state B1, as shown in FIG. 12, for instance) thereby many routines of machining on the workpiece having complex shape can be simultaneously executed without arranging the jig. Then, the machining efficiency and the operation rate of the jig can be also made higher.

BRIEF DESCRIPTION OF THE DRAWINGS

FIG. 1(*a*) is a view obliquely seen for showing an example of a three dimensional laser beam machine, and FIG. (*b*) is a view obliquely seen for showing a torch portion of the laser beam machine of FIG. 1(*a*);

DESCRIPTION OF THE PREFERRED EMBODIMENTS

Embodiments of the present invention will now be explained hereinafter, referring to drawings.

A three dimensional laser beam machine 1, which is a three dimensional linear cutting machine, has a base 2, and a table 3 is provided on the base 2, being free to move and drive in X axis horizontal direction. On the table 3, a workpiece W to be machined is free to locate. A column 5 is located on the base 2, bridging over the table 3, and the column 5 has a saddle 6, which is free to move and drive in Y axis horizontal direction (the direction orthogonal to the X axis direction).

Figure 1:
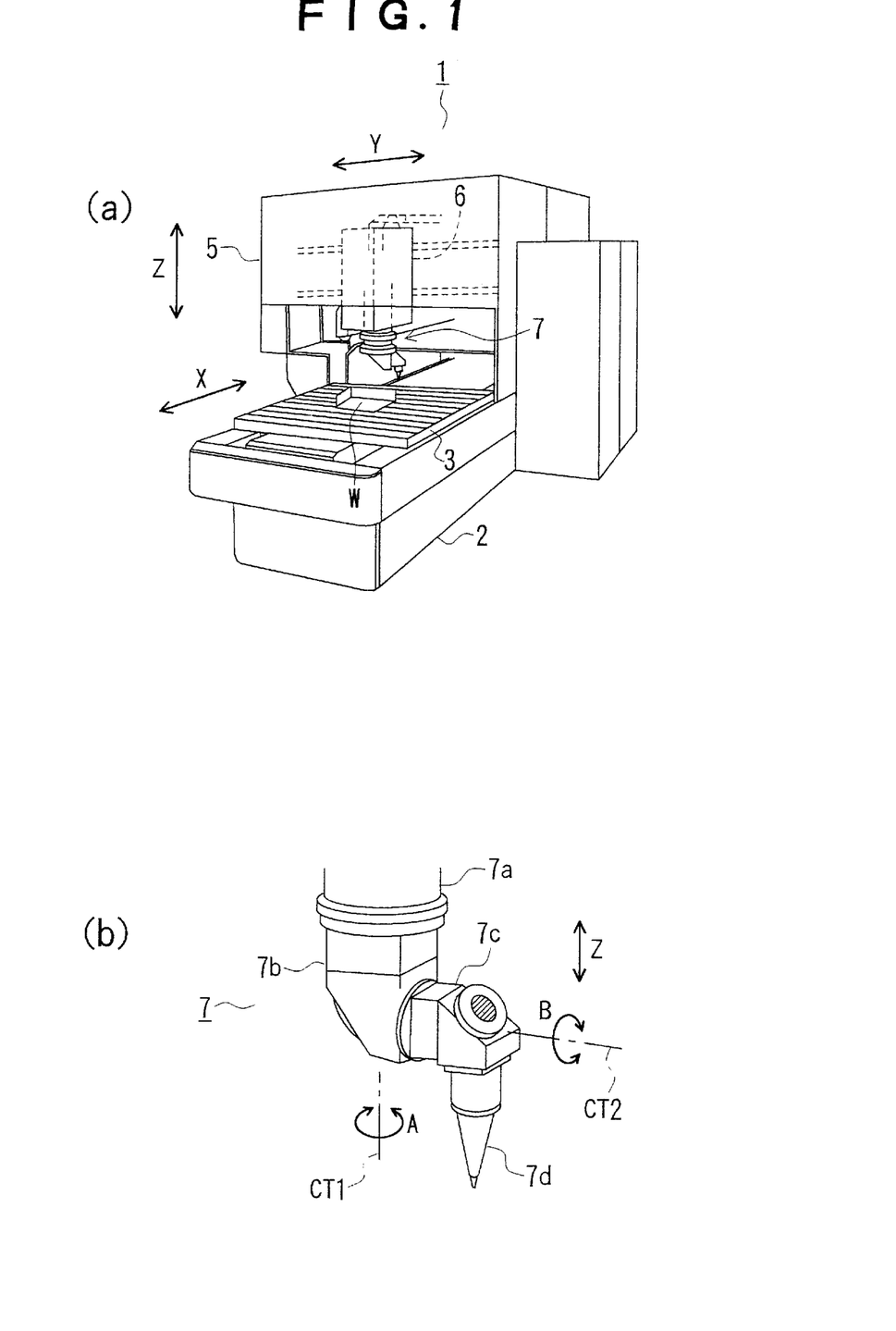

The saddle 6 has a head unit 7, which is free to move and drive in Z axis direction which is up and down direction. The head unit 7 is comprised of a first portion 7a on the saddle 6 side, a second portion 7b, being free to rotate and drive in A axis direction with respect to the first portion 7a with an axial center CT1 of the first portion 7a parallel to the Z-axis as its center, a third portion 7c, being free to rotate and drive in B axis direction with respect to the second portion 7b with a horizontal axial center CT2 of the second portion 7b as its center, and a torch 7d provided on the top end side of the third portion 7c, as shown in FIG. 1(b). Besides, a laser beam generating means (not shown) is provided being free to inject laser beam from the torch 7d.

As mentioned before, the laser beam machine 1 performs three dimensional machining on the workpiece W in such a manner that relative positional relation between the workpiece W located on the table 3 and the top end of the torch 7d is three-dimensionally changed, driving and positioning the table 3 in the X axis direction, the saddle 6 in the Y axis direction, the head unit 7 in the Z axis direction and the torch 7d in the A axis direction and the B axis direction and laser beam is injected from the torch 7d.

Figure 2:
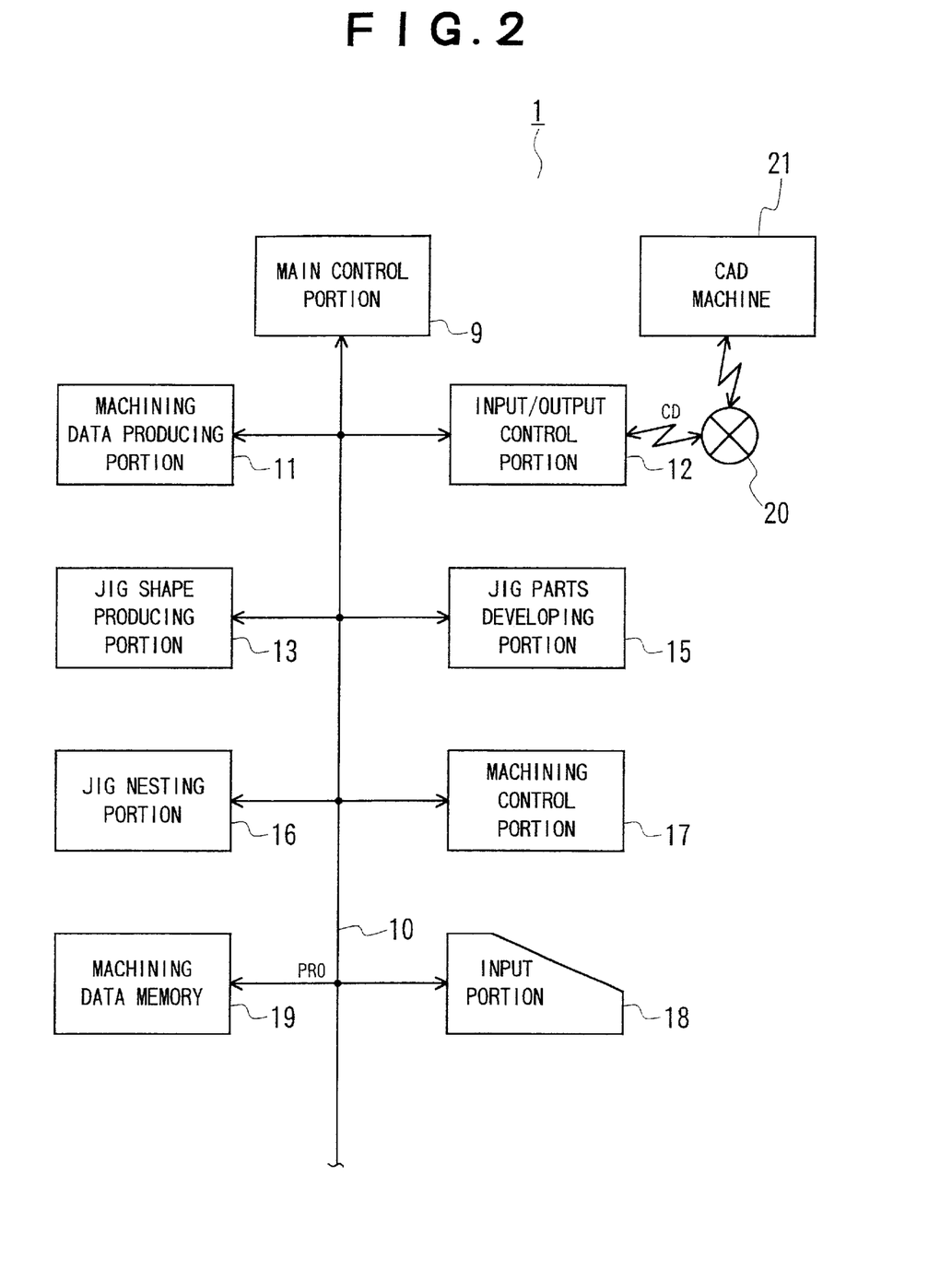
FIG. 2 is a control block diagram of the three dimensional laser beam machine as shown in FIG. 1.

And, the laser beam machine 1 has a main control portion 9, as shown in FIG. 2. With the main control portion 9, a machining data producing portion 11, an input/output control portion 12, a jig shape producing portion 13, a jig parts developing portion 15, a jig nesting portion 16, a machining control portion 17, an input portion 18, a machining data memory 19 and the like are connected through a bus line 10. And, the input/output control portion 12 connects with a CAD machine 21 through a telecommunication network 20, such as local area network and internet.

Figure 3:
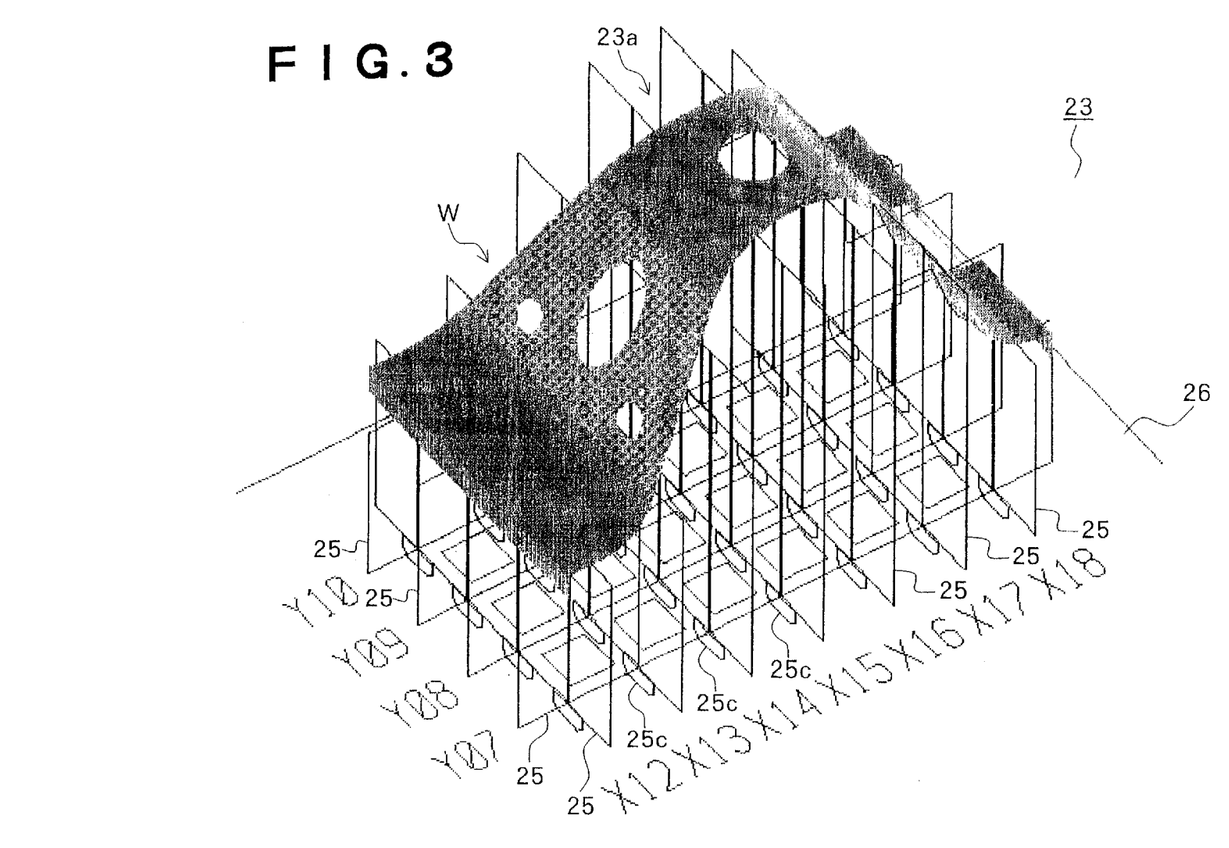
FIG. 3 is view for showing an example of a workpiece to be cut.

The laser beam machine 1 has the structure explained before. When the workpiece W having three dimensional machining shape, in a sheet shape as shown in FIG. 3, is machined with the laser beam machine 1, machining drawing of the workpiece W, that is, the drawing showing machining shape to be cut and machined with this laser beam machine 1 is firstly produced with a known CAD machine 21.

After the machining drawing of the workpiece W is produced as CAD data CD which is drawing data with the CAD machine 21, the CAD data CD is output to the laser beam machine 1 through the telecommunication network 20. In the CAD data CD, the three dimensional shape of the workpiece W as shown in FIG. 3 is shown, and the CAD data CD is immediately stored in the machining data producing portion 11.

The main control portion 9 instructs the machining data producing portion 11 to automatically compose machining program PRO for instructing the head unit 7 on the machining movement of the workpiece W with a known method on the basis of the three dimensional shape of the workpiece represented by the CAD data CD so as to store the machining program PRO composed in the machining data memory 19.

At the same time of instructing the machining data producing portion 11 to compose the machining program PRO of the workpiece W, the main control portion 9 instructs the jig shape producing portion 13 to compose the data of a jig assembly for supporting the workpiece W at a predetermined position on the table 3 on the basis of the CAD data CD.

Figure 4:
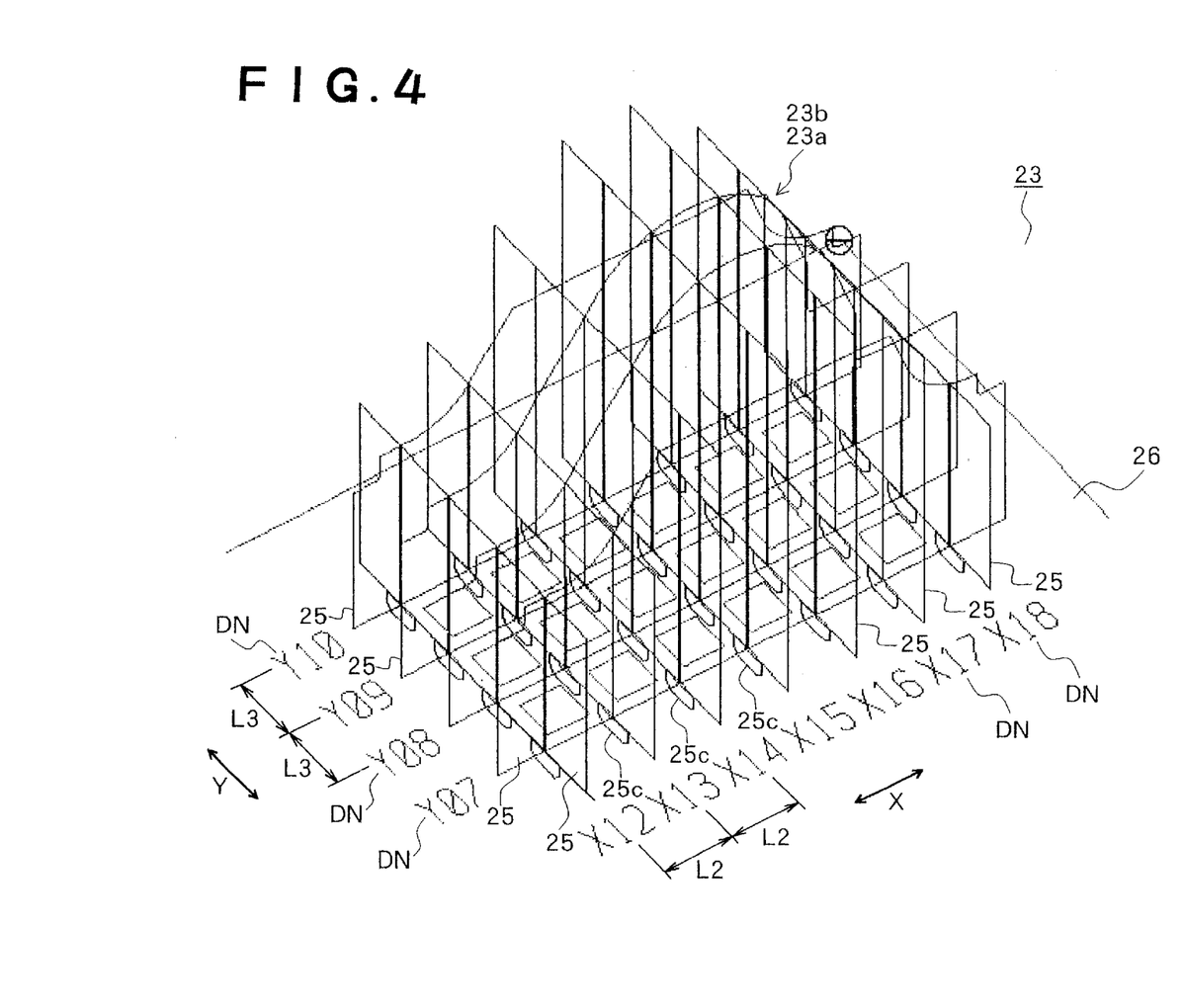
FIG. 4 is a whole view for showing an example of a jig assembly.

Then, the jig shape producing portion 13 virtually develops the workpiece W represented by the CAD data CD in a memory as shown in FIG. 3, and a virtual support solid 23b for supporting the workpiece W on the table 3 is virtually produced as shown in FIG. 4. The concrete shape of the workpiece W is clear from the CAD data CD. Then, the virtual support solid 23b for holding the workpiece W at a predetermined position on the table 3 is produced in such a manner that a workpiece support face 23a as the workpiece supporting portion for supporting the workpiece W by abutting on the surface of the workpiece W, of the virtual support solid 23b, is produced along the shape of the surface of the workpiece W as shown in FIG. 8.

Figure 8:
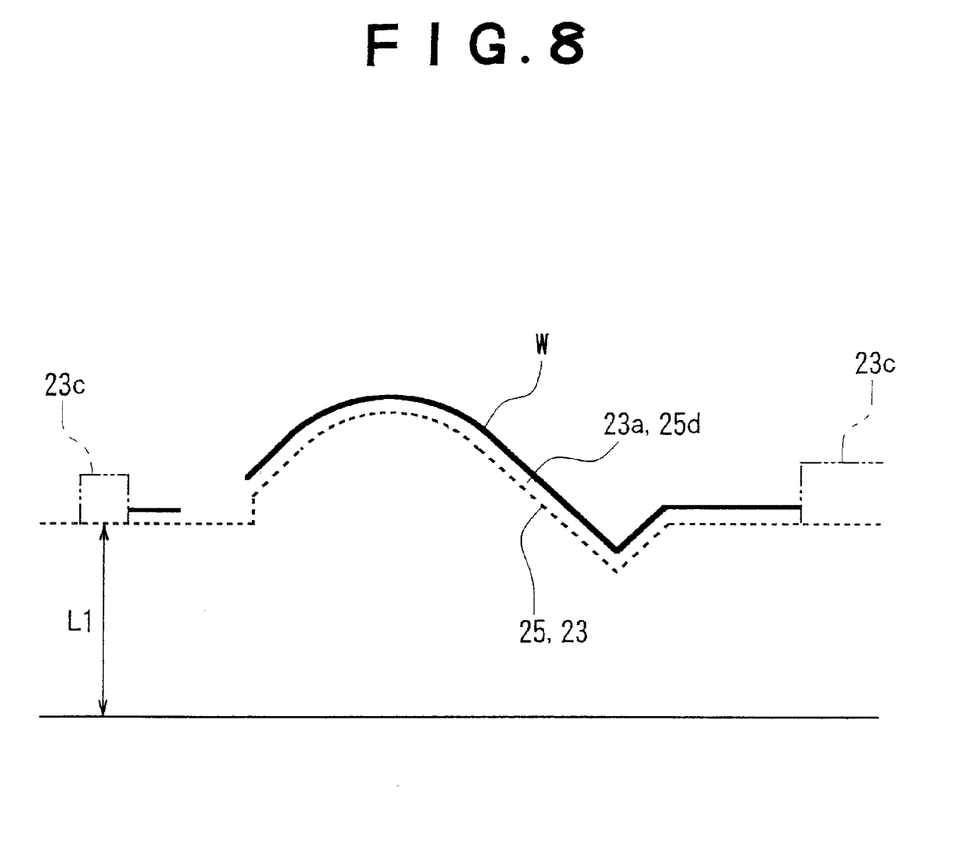
FIG. 8 is a sectional view for showing positional relation between a workpiece and the jig plate.

In the concrete, as shown in FIG. 4, the virtual support solid 23b for supporting the workpiece W on the table 3 is imagined on the basis of a machining standard height position L1 for instructing the position of holding the workpiece W by the jig assembly 23 as shown in FIG. 8 which is input from the input portion 18 by an operator. On the upper portion of this solid 23b, the workpiece support face 23a is formed, and the lower portion thereof is located on the table 3.

The shape of the workpiece support face 23a can be easily produced by diverting the CAD data CD of the workpiece W. After the virtual support solid 23b is produced, the main control portion 9 instructs the jig parts developing portion 15 to develop the jig parts 25 on the basis of the virtual support solid 23b produced.

Figure 7:
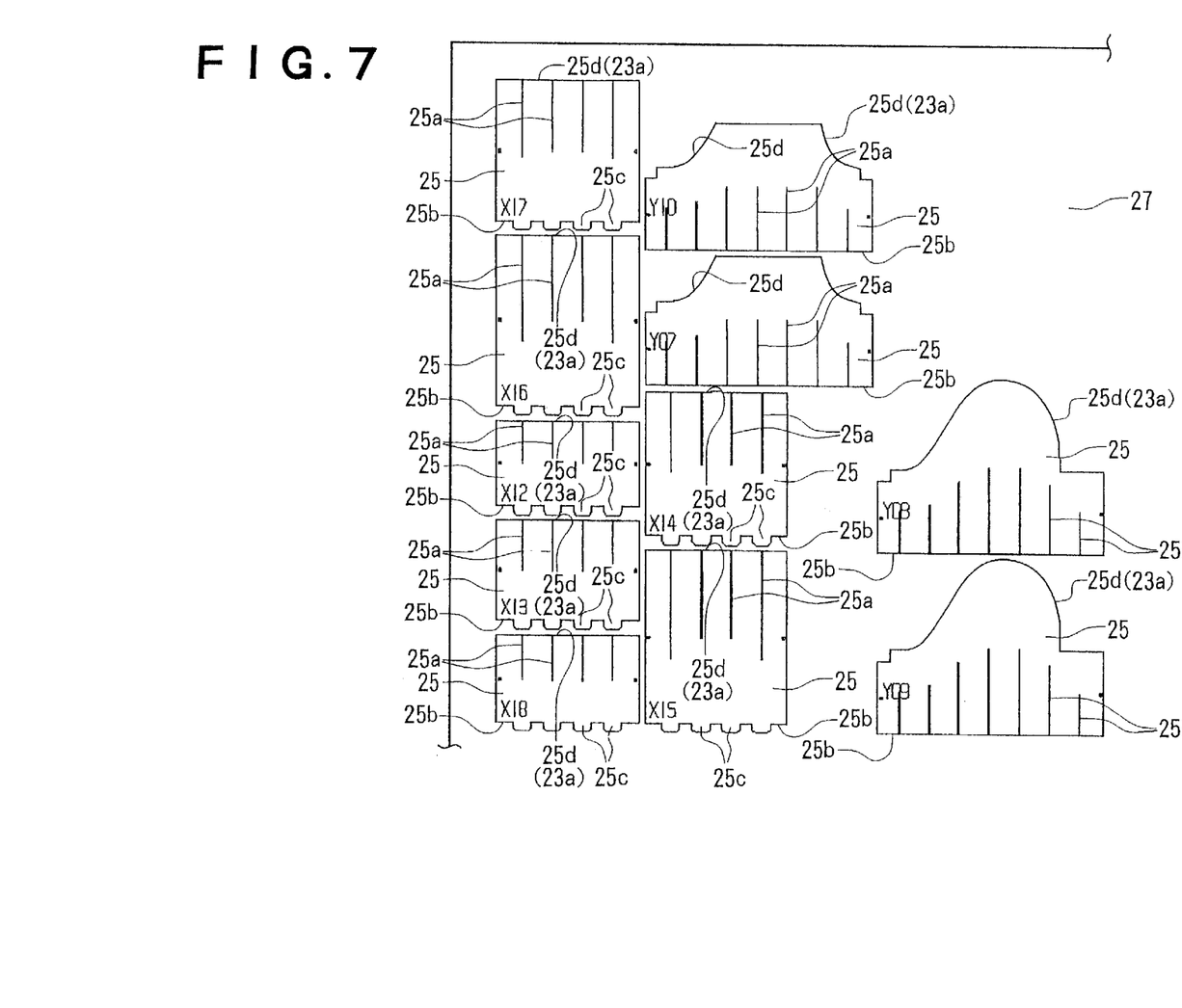
FIG. 7 is an enlarged view for showing the jig plates of FIG. 5.

As shown in FIG. 4, the jig parts 25 are formed, being equal to the shape of the sections when the virtual support solid 23b is cut by planes parallel to the X axis direction and the Y axis direction which are orthogonal to each other. That is, the virtual support solid 23b is cut by seven sheets of the parallel cutting planes (X12, X13, . . . X18) set at intervals of L2 in the X axis direction, for instance, and is cut by four sheets of the parallel cutting planes (Y07, Y08, Y09, Y10) set at intervals of L3 in the Y axis direction, as shown in FIG. 4. And, each jig parts 25 is formed in the shape equal to the section of these cutting faces, as shown in FIG. 7. Then, a workpiece support portion 25d having the shape corresponding to the workpiece support face 23a is formed on the corresponding portion of the jig parts 25 for supporting the workpiece W by abutting on the workpiece W in the jig parts 25, as shown in FIG. 7. Since the shape of the workpiece support portion 25d corresponds to the cutting portion of the virtual support solid 23b corresponding to each jig parts 25, it is not always a curve as the jig parts 25 in the Y axis direction, but also a straight line as the jig parts 25 in the X axis direction.

Figure 9:
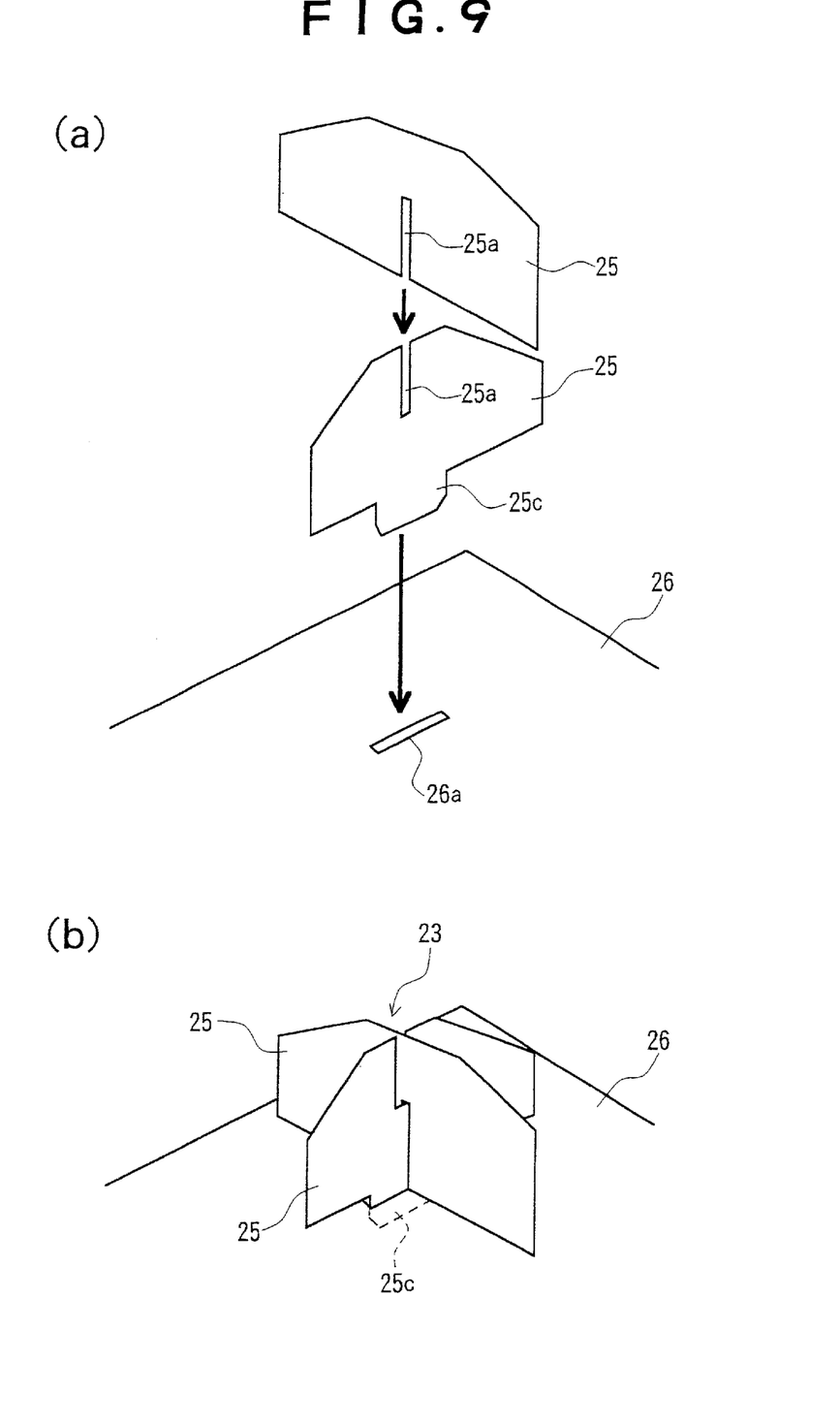
FIG. 9 is a view obliquely seen for showing a method of assembling of the jig plates.

As shown in FIG. 9, an engagement groove 25a is formed on each jig parts 25 so as to engage the jig parts 25 of the X axis direction and the Y axis direction, intersecting each other. At the jig parts 25 in the Y axis direction, seven engagement grooves 25a for engaging the jig parts 25 in the X axis direction and in the Y axis direction with each other are formed for the upper hand from an installation portion 25b of the lower hand of FIG. 7 at intervals of L2. Besides, at the jig parts 25 in the X axis direction, four engagement grooves 25a for engaging the jig parts 25 in the X axis direction and in the Y axis direction with each other are formed for the installation portion 25b of the lower hand from the upper hand of FIG. 7 at intervals of L3. These engagement grooves are formed so as to comprise the jig assembly 23 comprising a part of the virtual support solid 23b when the jig parts 25 in the X axis direction and in the Y axis direction are engaged with each other through the engagement grooves 25a, as shown in FIG. 9.

Figure 10:
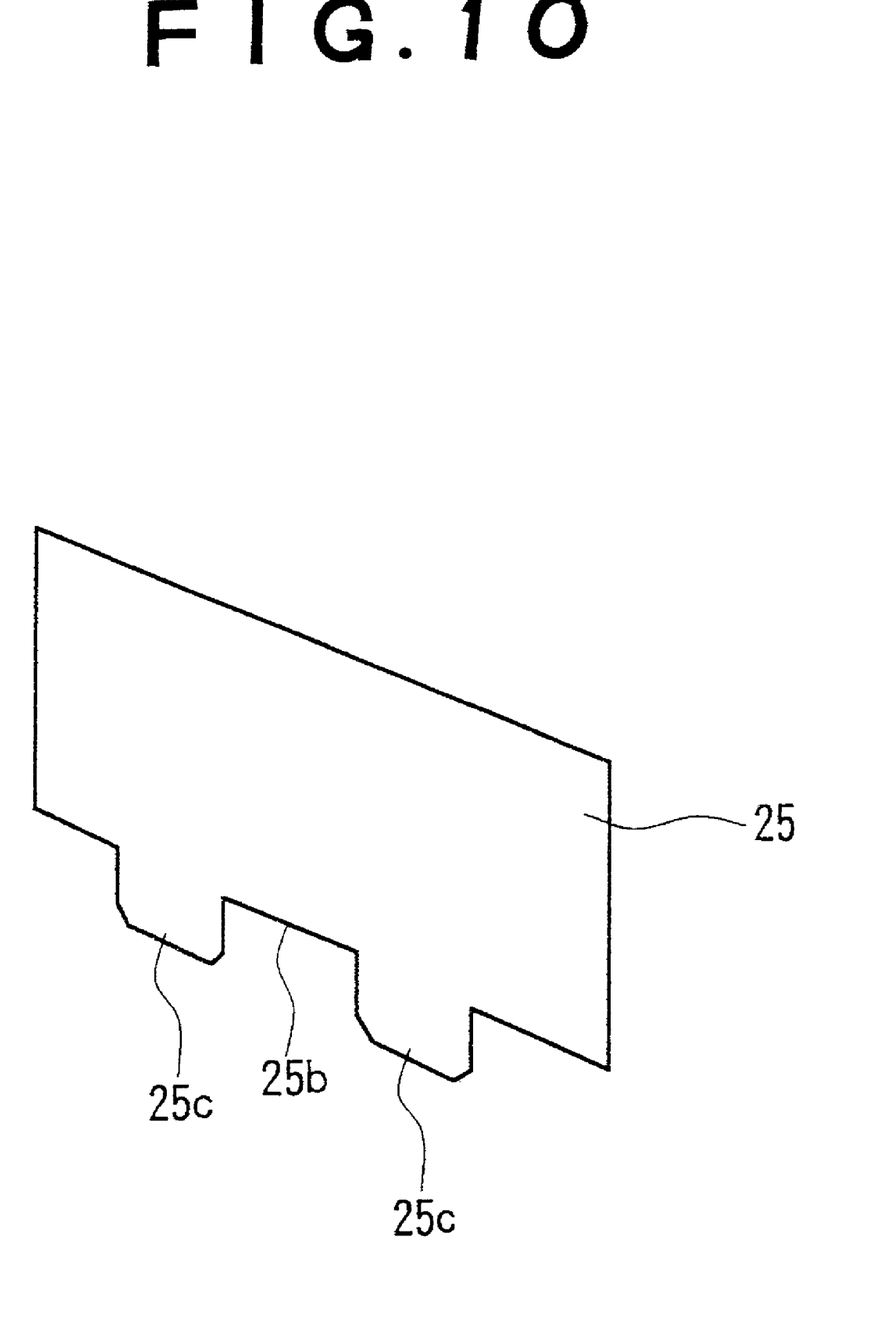
FIG. 10 is a view obliquely seen for showing an example of the jig plate.

As shown in FIG. 9 or FIG. 10, at least one mounting notches 25c are formed at the lower portion of the jig parts 25 in the X axis direction (or in the Y axis direction). The mounting notch 25c is formed being free to engage with a mounting hole 26a provided at a jig base 26 explained hereinafter.

After the jig parts 25 corresponding to the virtual support solid 23b is developed concerning the virtual support solid 23b in this way, the main control portion 9 instructs the jig nesting portion 16 to nest the jig parts 25 and the jig base 26 installing the jig parts 25 thereon.

Figure 5:
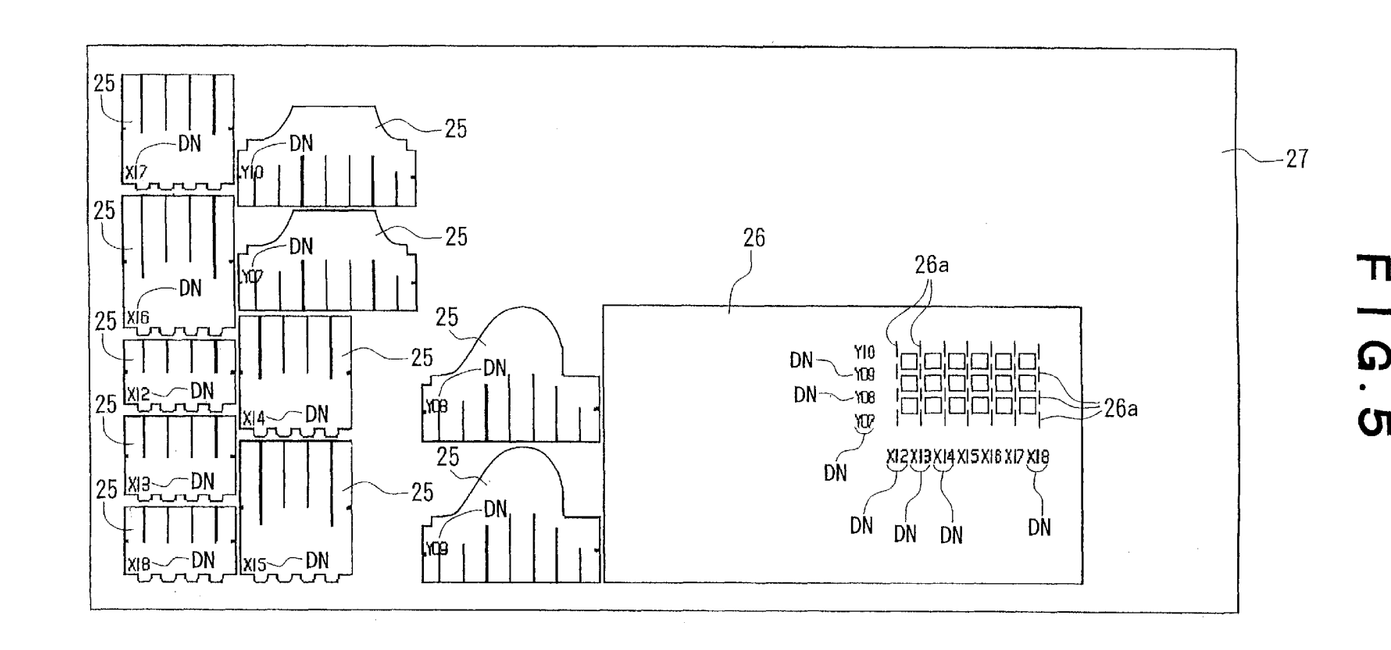
FIG. 5 is a view for showing an example of nesting of jig plates and a base plate.

Receiving this, the jig nesting portion 16 performs nesting for taking the respective jig parts 25 (eleven sheets in total) and the jig base 26 installing these jig parts 25 thereon comprising the jig assembly 23 to be used for machining on the workpiece W out of a material sheet 27, as shown in FIG. 5. On this occasion, the jig nesting portion 16 gives each jig parts 25 after performing nesting parts division sign DN, such as X12, X13 . . . X18, Y07, Y08, Y09, Y10, that is, sign showing sectional position in the virtual support solid 23b of each jig parts 25, for differentiating the respective jig parts 25 in the material sheet 27 from another. Besides, a division mark printing command is produced so as to print these parts division sign DN on the surface of the parts, baking the surface of the material sheet 27 by laser beam when the respective jig parts 25 are cut by the torch 7d.

Figure 6:
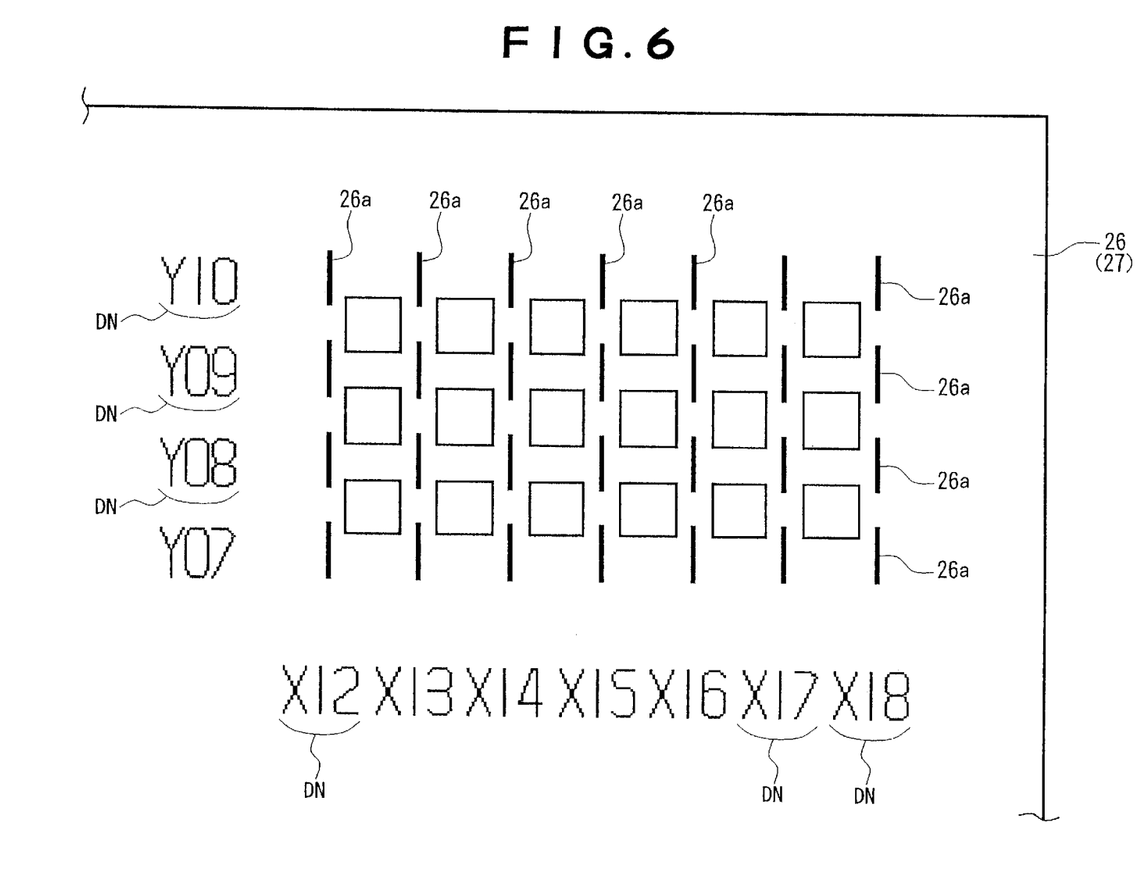
FIG. 6 is an enlarged view for showing a part of the base plate of FIG. 5.

And, the jig nesting portion 16 computes and determines the location of the mounting hole 26a for installing each jig parts 25 at a predetermined position of the jig base 26 nested at the same time of nesting of the jig base 26 installing the jig parts 25 thereon. The mounting holes 26a are set at intervals of L2 the same as the respective cutting planes (X12, X13, . . . X18) in the X axis direction set when the respective jig parts 25 are produced by the jig part developing portion 15, as shown in FIG. 6, and furthermore, are located at the positions corresponding to the mounting notches 25c respectively formed on the jig parts 25 in the X axis direction. Besides, the jig nesting portion 16 produces a division mark printing command at the same time of the location of the mounting holes 26a so as to print the parts division signs DN of the jig parts 25 in the X axis direction to be installed in the mounting holes 26a and the parts division signs DN of the jig parts 25 of the Y axis direction to be installed, crossing the jig parts 25 in the X axis direction on the base surface, baking the surface of the material sheet 27 by laser beam when the jig base 26 is cut by the torch 7d in a similar way above-mentioned.

After the jig parts 25 and the jig base 26 installing the jig parts 25 thereon are nested on the material sheet 27 and the division sign printing instruction of the parts division sign DN for representing each jig parts 25 is produced in this way, the main control portion 9 instructs the machining control portion 17 to start to produce the jig assembly 23 for cutting and machining on the workpiece W on the basis of the data produced.

Receiving this, the machining control portion 17 locates the material sheet 27 on the table 3 through a handling robot (not shown) and laser beam is supplied to the material sheet 27 located from the head unit 7 so as to cut and machine the respective jig parts 25 and the jig base 26 installing these jig parts 25 thereon, as shown in FIG. 5. The jig parts 25 and the jig base 26 are effectively cut and machined out of the material sheet 27 since these jig parts 25 and the jig base 26 installing the jig parts 25 thereon are properly located so as not to produce vain part on the material sheet 27.

After the jig parts 25 and the jig base 26 are cut out of the material sheet 27 in this way, the jig base 26 cut out is located on the table 3 as shown in FIG. 1(a). And, referring to each parts division sign DN printed by the torch 7 on the jig base 26 and the jig parts 25, an operator installs corresponding jig parts 25 in the X axis direction on the jig base 26, inserting mounting notch 25c in the mounting hole 26a so as to engage with each other, so as to parallel locate the jig parts 25 in the X axis direction at intervals of L2. Subsequently, the jig parts 25 in the Y axis direction are engaged with the jig parts 25 in the X axis direction which are already attached on the jig base 26, inserting the engagement grooves 25a, 25a in each other so as to pralallel locate the jig parts 25 in the Y axis direction at intervals of L3 as shown in FIG. 4 by referring to the parts division sign DN in a similar way. Finally, the jig assembly 23 is assembled on the jig base 26.

Then, the jig assembly 23 comprised of a plurality of jig parts 25 assembled so as to intersect being orthogonal to each other in the X axis direction and in the Y axis direction is formed on the table 3. On the upper face of the jig assembly 23 formed, the workpiece support face 23a, which are comprised of the workpiece support portions 25d formed at the respective jig parts 25, is immediately formed. By assembling two or more jig parts 25 in the direction intersecting each other so as to engage with each other, the jig parts 25 intersecting each other are assembled, supporting one parts by the other parts. As the result, the jig parts themselves are three-dimensionally assembled. Then, many jig parts can be assembled without providing complex supporting means.

Then, the workpiece W to be machined is located on the workpiece support face 23a, as shown in FIG. 3. As already mentioned before, the workpiece support face 23a is formed so as to correspond to the shape facing the workpiece support face 23a side of the workpiece W as shown in FIG. 8 since it is composed on the basis of the CAD data CD at the time of plotting the three-dimensional workpiece W. Therefore, the workpiece W is located on the workpiece support face 23a so as to exactly fit.

In such a state, the main control portion 9 instructs the machining control portion 17 to execute machining on the workpiece W on the basis of the machining program PRO. Receiving this, the machining control portion 17 executes the machining on the workpiece W. On this occasion, correct machining is possible since the workpiece W is held on the jig assembly 23.

The above-mentioned embodiment refers to the case where the jig assembly 23 comprises the jig parts 25 assembled orthogonalizing each other. But, it is not always necessary to assemble the jig parts 25 so as to intersect in the direction orthogonalizing each other, but the assembly in the direction intersecting each other excluding at an angle of 90° may be possible. Furthermore, various kinds of methods of assembling the jig parts 25 may be adopted in addition to the method of assembling the jig parts 25, intersecting each other. That is, any assembly method can be used as long as the workpiece support portion 23a can be formed along a surface shape of the supported portion of the workpiece W to be machined by collecting a plurality of jig parts 25.

Besides, the above-mentioned embodiment refers to the case where the jig parts 25 is machined with the three-dimensionally linear cutting machining unit for machining on the workpiece W, such as the three-dimensional laser beam machine 1. But, another three-dimensional linear cutting machining unit excluding the three-dimensional linear cutting machining unit for machining on the workpiece W may be of course used for the machining on the jig parts 25.

Furthermore, a plasma gas processing machine or another proper linear cutting machining unit may be used as the three-dimensional linear cutting machining unit for machining on the jig parts 25 in addition to the three-dimensional laser beam machine 1.

Besides, it is not always necessary to form the jig base 26 for supporting the jig assembly 23 together with the jig parts 25 for supporting each workpiece W, but it is of course possible to use the jig base prepared in advance as a common base for the respective jig assemblies.

Furthermore, workpiece moving prevention means, such as a workpiece provisional locking unit comprised of bolts and nuts, and a workpiece provisional fixture 23c (see FIG. 8) such as moving prevention notch may be provided at proper positions of the jig assembly 23 so as not shift the workpiece W located on the workpiece support face 23a during machining. When the workpiece provisional fixture 23c is formed at the jig parts 25, it is easy and convenient to simultaneously machine the workpiece provisional fixture at the time of cutting machining on the jig parts 25 in comparison with the case where the workpiece provisional fixture 23c is afterwards attached.

Figure 11:
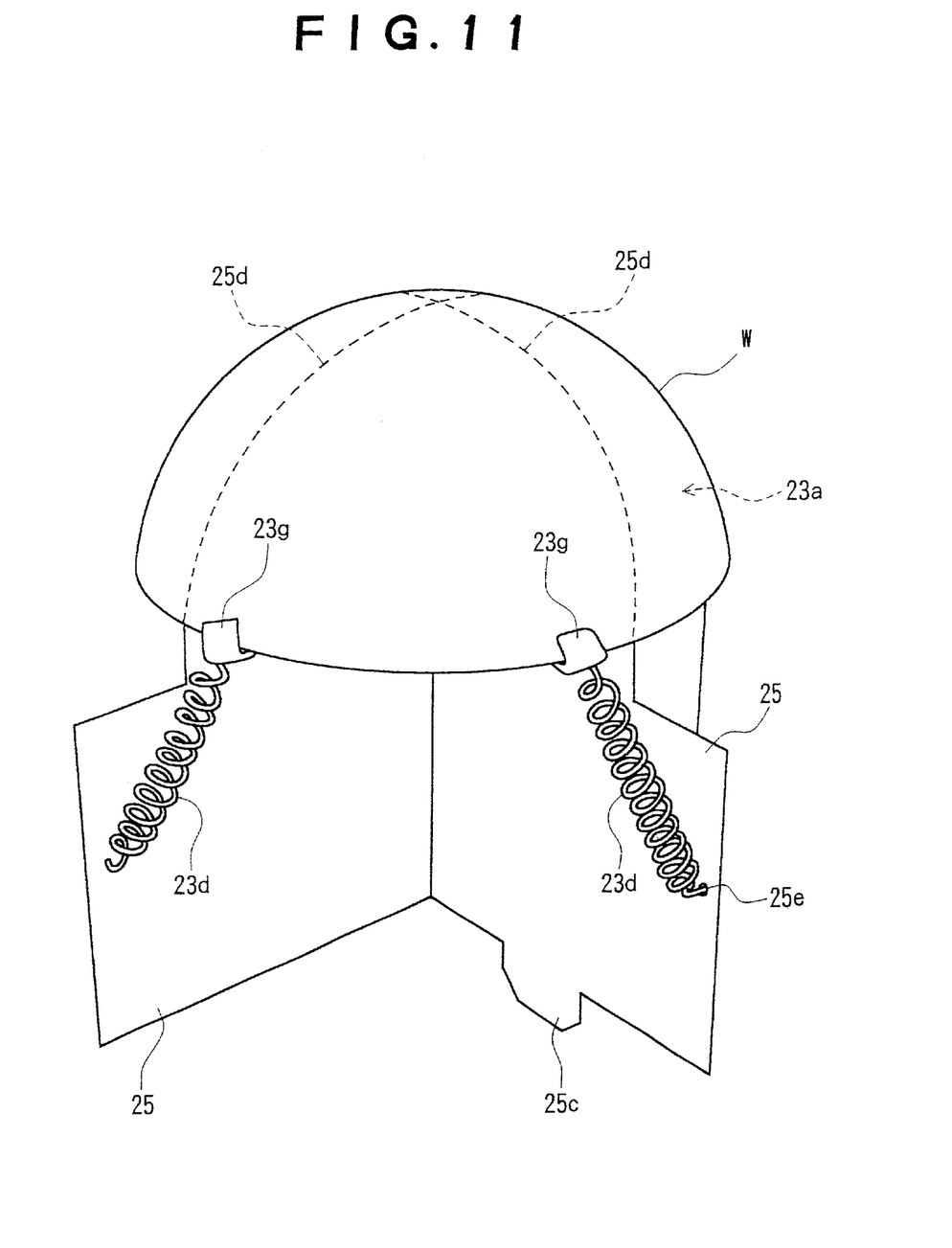
FIG. 11 is a view obliquely seen for showing an another example of the jig assembly.

Various kinds of workpiece moving prevention means are thinkable in addition to one as shown in FIG. 8. Such a structure as shown in FIG. 11, for instance that a spring 23d which one end is engaged with a hole 25e formed at the jig parts 25 is used and a clip 23g for holding a workpiece is provided at the other end of the spring 23d is also possible. In this case, the workpiece W located on the workpiece support face 23a comprised of the workpiece supporting portions 25d of the respective jig parts 25 may be held with four clips 23g located at about 90° pitch so as not to inadvertently move the workpiece W during machining.

Besides, in the above-mentioned embodiment, the workpiece W is in the shape of a sheet. But, the shape of the workpiece W is not always a sheet-shaped one, but any shape of the workpiece may be used as long as it can be machined with a three-dimensional linear cutting machining unit.

In a case of the workpiece W having complex shape as shown in FIG. 12, it may be necessary to machine in the plural number of routines, changing the position of locating the workpiece on the table, from a locating state A1 in the figure into a locating state B1 for instance. In such a case, the respective jig parts 25 may be formed so as to form the workpiece support face 23a which is the workpiece supporting portion for supporting the workpiece W of the locating state A1 and the workpiece support face 23a by which the workpiece W of the locating state B1 is supported (further more workpiece support faces 23a if necessary) on the same jig assembly 23 from the drawing data CD showing the three dimensional shape of the workpiece W, and the plural number of machining routines may finish by simply moving the workpiece W on the jig assembly 23 without exchanging the jig assembly 23 every routine.

Besides, a plurality of workpiece support faces 23a concerning a single kind of workpiece W may be formed on the same jig assembly 23 so as to execute multiple machining, that is, so as to execute machining, locating a plurality of workpieces W one time on the jig assembly 23.

On this occasion, a plurality of kinds of workpiece support faces 23a which can be formed on the jig assembly 23 are not always the workpiece support faces 23a of a plurality of routines of the same kind of workpiece W, but also the workpkece supporting faces 23a respectively formed for supporting different kinds of workpieces W on the same jig assembly 23.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A method of producing jig for three dimensional linear cutting machining when a jig to be used for fixing a workpiece is produced at the time of executing cutting machining on said workpiece with the three dimensional linear cutting machining unit; comprising:

producing a shape of a workpiece supporting portion for supporting said workpiece by abutting on said workpiece from drawing data showing three dimensional shape of said workpiece when said workpiece is supported on a table of said three dimensional linear cutting machining unit through said jig;

cutting two or more jig parts each having a shape corresponding to said shape of said workpiece supporting portion out of a material sheet on the basis of said shape of said workpiece supporting portion produced; and assembling said two or more jig parts cut out and producing a jig assembly having said shape corresponding to said workpiece supporting portion by said jig parts assembled.

2. The method of producing jig for three dimensional linear cutting machining as set forth in claim 1, wherein said jig parts are cut and machined with said three dimensional linear cutting machining unit for machining said workpiece supported by said jig parts.

3. The method of producing jig for three dimensional linear cutting machining as set forth in claim 1, wherein said two or more jig parts are cut out of the same material sheet.

4. The method of producing jig for three dimensional linear cutting machining as set forth in claim 1, wherein said jig assembly is produced by attaching said jig parts on a jig base for supporting said jig assembly with respect to said table.

5. The method of producing jig for three dimensional linear cutting machining as set forth in claim 1, wherein identification marks are attached to said two or more jig parts for indentifying these jig parts, and said identification marks are attached to a corresponding jig parts with said three dimensional linear cutting machining unit when said jig parts are cut out of said material sheet so as to identify by the naked eye.

6. The method of producing jig for three dimensional linear cutting machining as set forth in claim 4, wherein a first parts connecting means is formed at said jig parts, and said jig parts are attached to said jig base through said first parts connecting means.

7. The method of producing jig for three dimensional linear cutting machining as set forth in claim 4, wherein a second parts connecting means is formed at said jig base, and said jig parts are attached to said jig base through said second parts connecting means.

8. The method of producing jig for three dimensional linear cutting machining as set forth in claim 1, wherein said two or more sheets of jig parts are assembled such that said jig parts are located at a predetermined interval in a first direction so as to be parallel to each other, and said jig parts are located at a predetermined interval in a second direction intersecting said first direction so as to be parallel to each other.

9. The method of producing jig for three dimensional linear cutting machining as set forth in claim 5, wherein said three dimensional linear cutting machining unit is a laser beam machine, and said identification mark is attached to said jig parts with a torch of said laser beam machine, by printing, baking a surface of said material sheet.

10. The method of producing jig for three dimensional linear cutting machining as set forth in claim 4, wherein said identification mark showing a position for installing said jig parts is attached to said jig base so as to identify by the naked eye with said three dimensional linear cutting machining unit when said jig base is cut out of said material sheet.

11. The method of producing jig for three dimensional linear cutting machining as set forth in claim 1, wherein a workpiece moving prevention means is formed at said jig assembly for preventing said workpiece located on said jig assembly from moving.

12. The method of producing jig for three dimensional linear cutting machining as set forth in claim 11, wherein said workpiece moving prevention means is a workpiece provisional locking portion formed at said jig parts, said workpiece provisional locking portion is simultaneously machined when said jig parts are cut out of said material sheet.

13. The method of producing jig for three dimensional linear cutting machining as set forth in claim 1, wherein said drawing data showing said three dimensional shape of said workpiece are drawing data concerning a drawing showing machining shape to be cut and machined on said workpiece with said three dimensional linear cutting machining unit.

14. The method of producing jig for three dimensional linear cutting machining as set forth in claim 1, wherein a plurality of said workpiece supporting portion shapes are produced so as to support a plurality of workpieces on a single jig assembly.

15. The method of producing jig for three dimensional linear cutting machining as set forth in claim 1, wherein a plurality of kinds of said workpiece supporting portion shapes are produced concerning a different workpiece so as to support a plurality of kinds of workpieces on a single jig assembly.

16. The method of producing jig for three dimensional linear cutting machining as set forth in claim 1, wherein a plurality of different workpiece supporting portion shapes are produced concerning the same workpiece so as to support on a single jig assembly, changing a locating state of the same workpiece.

* * * * *